UNITED STATES PATENT OFFICE.

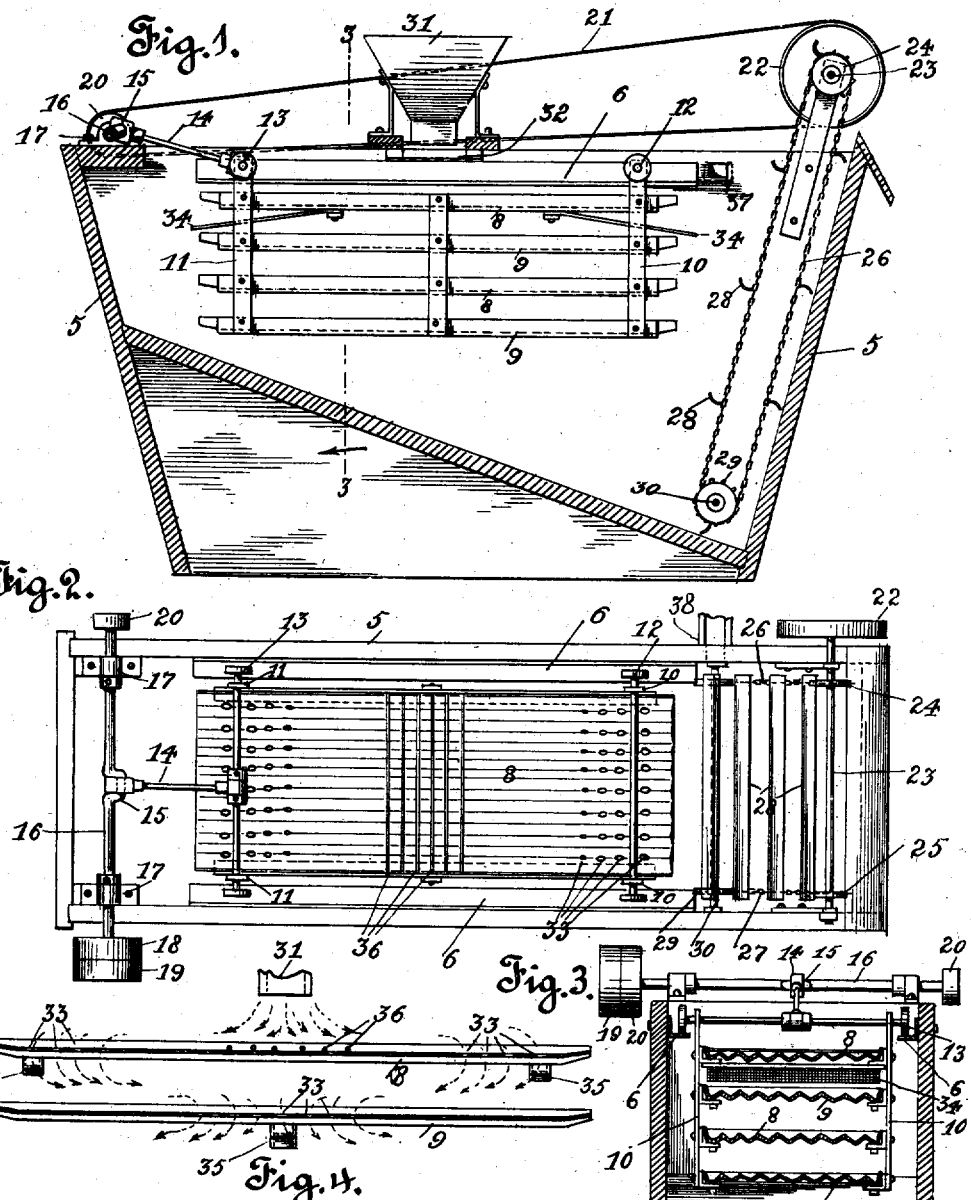

THOMAS HUSSEY, OF HOLLYWOOD, CALIFORNIA.

GOLD-SAVING MACHINE.

No. 890,059.      Specification of Letters Patent.      Patented June 9, 1908.

Application filed August 20, 1907. Serial No. 389,338.

*To all whom it may concern:*

Be it known that I, THOMAS HUSSEY, a citizen of the United States, residing in the city of Hollywood, county of Los Angeles, State of California, have invented new and useful Improvements in Gold-Saving Machines, of which the following is a specification.

My invention relates to a machine which may be used as a separator or concentrator either wet or dry, and the object thereof is to provide a simple and efficient machine which will readily separate the metallic values of the material from the gangue.

In the drawings forming a part of this application I have illustrated my machine as applied to the wet process and Figure 1 shows a side elevation of the machine with the water tank in section. Fig. 2 is a plan. Fig. 3 is a section on the line 3—3 of Fig. 1. Fig. 4 is a sectional detail of the pans, and some of the other parts.

In the drawings 5 is a tank for holding water. Extending along each side of the tank and near the top thereof are tracks 6. Between these tracks and suspended below the frame are the concentrating pans 8 and 9, which are preferably used in pairs. These pans are secured together by the vertical end pieces 10 and 11 which are carried by trucks 12 and 13 which are supported upon and travel on track 6, to one of these trucks 13 is secured a pitman rod 14 the other end of which is secured to crank 15 on shaft 16. Shaft 16 is mounted in bearings 17 secured to the tank. On one end of the crank shaft is the driving pulley 18 and a loose pulley 19. At the other end of the crank shaft is a pulley 20 on which is mounted belt 21. Belt 21 also passes around pulley 22 which is mounted on conveyer shaft 23, which shaft is mounted in bearings secured to the tank at the other end thereof from the crank shaft. On this conveyer shaft are sprockets 24 and 25 over which pass sprocket chains 26 and 27. To these sprocket chains are secured conveyer buckets 28. These sprocket chains also pass over pulleys 29 mounted on shaft 30 at the bottom of the tank. A feed hopper 31 directs the material upon screen 32, which screens out all material too coarse to pass through the perforations 33 of the concentrator pans. As shown in Fig. 2 the perforations in pan 8 are at the ends thereof and they gradually increase in size from the point at which they commence toward the outer ends. The perforations in pan 9 are in the center thereof as shown in detail in Fig. 4. In pan 9 the perforations are smallest at the outside and increase in size to the center. These pans are longitudinally corrugated and the perforations are in the apices of the corrugations. The bottom of the extreme outer ends of the pans beyond the perforations slope slightly upwardly as best shown in Fig. 1, so as to prevent the material from flowing over the ends of the pans. When the metallic values or concentrates are very fine I prefer to secure to the upper pan 8 screens 34 which will cause the coarser material passing through the perforations of the pan to travel on the screen and fall into the tank beyond the lower pans. It is sometimes desirable to secure a trough 35 below the coarsest perforations of pan 8 and pan 9 to collect the values that pass therethrough.

In the operation of my device the material to be separated or concentrated will be fed into the hopper and will pass downwardly therefrom upon screen 32 and thence upon the upper pan 8, in the center of which I have provided distributing wires 36 which aid in more evenly distributing the material upon the pan. These wires can be omitted if desired. Power is applied to operate the crank shaft which causes the pans to travel back and forth in the water in the tank, this motion causes the material to spread out upon the upper pan and to travel toward the ends thereof and as it spreads and travels the heaviest portion of the material being treated will pass into the bottom or lowest part of the corrugations which are practically riffles and the lighter material of pan 8 will pass through the perforations near the end thereof and will drop down upon pan 9, upon which they will spread until they pass out of the perforations in the center thereof. When it is desired another series of pans 8 and 9 may be used. It will sometimes happen that the material is of such character that the separation of the values may be accomplished by one of the pans 8 alone. With some materials the use of pans 8 and 9 will accomplish the desired separation, while with other material it requires a duplication of pans 8 and 9. It will be seen that the material passes from one pan to another until it finally drops upon the floor of the tank which is made sloping so as to cause the material to pass to the conveyer, which carries it out of the tank.

By this construction it will be seen that I have provided a separator or concentrator of very great capacity as by having the overflow from the pans pass to the pan below it is only necessary to secure a portion of the values or concentrates on each pan.

If it is desired to have a current of water flowing through the tank, I provide a port 37 in one of the sides and a trough 38 leading therefrom to carry the water away.

Having described my invention what I claim is:—

1. In a gold saving machine a concentrator pan having a corrugated bottom provided with perforations in the apices near the ends thereof, said bottom being turned upwardly at the ends beyond the perforations; and means to move said pan horizontally in the directions that the corrugations run.

2. In a gold saving machine a concentrator comprising two pans having corrugated bottoms, the top pan having perforations in the apices of the corrugations near the ends of the pan and the lower pan having perforations in the apices of the corrugations near the center of the pan, the bottoms of said pans at the ends thereof being slanted upwardly, the upper pan being superposed, and adapted to discharge into the lower pan; and means to move said pans horizontally and longitudinally.

3. A gold saving machine comprising a tank, having tracks on the side thereof near the top; concentrator pans in said tank mounted to travel on said tracks, said concentrator pans being arranged in pairs one pan above the other, and having longitudinally corrugated bottoms the ends of which slope upwardly, said pans having perforations in the apices of the corrugations, the upper pans of each pair having the perforations near the ends adapted to discharge into the lower pan, and the lower pan of each pair having the perforations near the center; and means to move said pans horizontally and longitudinally.

4. In a gold saving machine a plurality of concentrator pans arranged in pairs one pan above the other, said pans having corrugated bottoms the ends of which slope upwardly and having perforations in the apices of the corrugations, the upper pans of each pair having the perforations near the ends adapted to discharge into the lower pan and the lower pair having the corrugations near the center; and means to vibrate said pans in the direction that the corrugations run.

5. In a gold saving machine comprising a tank having tracks on the side thereof near the top; concentrator pans in said tank mounted to travel on said tracks, said concentrator pans being arranged in pairs one pan above the other with longitudinally corrugated bottoms the ends of which slope upwardly; said pans having perforations in the apices of the corrugations, the upper pans of each pair having the perforations near the ends adapted to discharge into the lower pan, and the lower pan of each pair having the perforations near the center; means to move said pans on said track; and a conveyer in the end of said tank.

In witness that I claim the foregoing I have hereunto subscribed my name this 13th day of August, 1907.

THOMAS HUSSEY.

Witnesses:
G. E. HARPHAM,
S. B. AUSTIN.